UNITED STATES PATENT OFFICE.

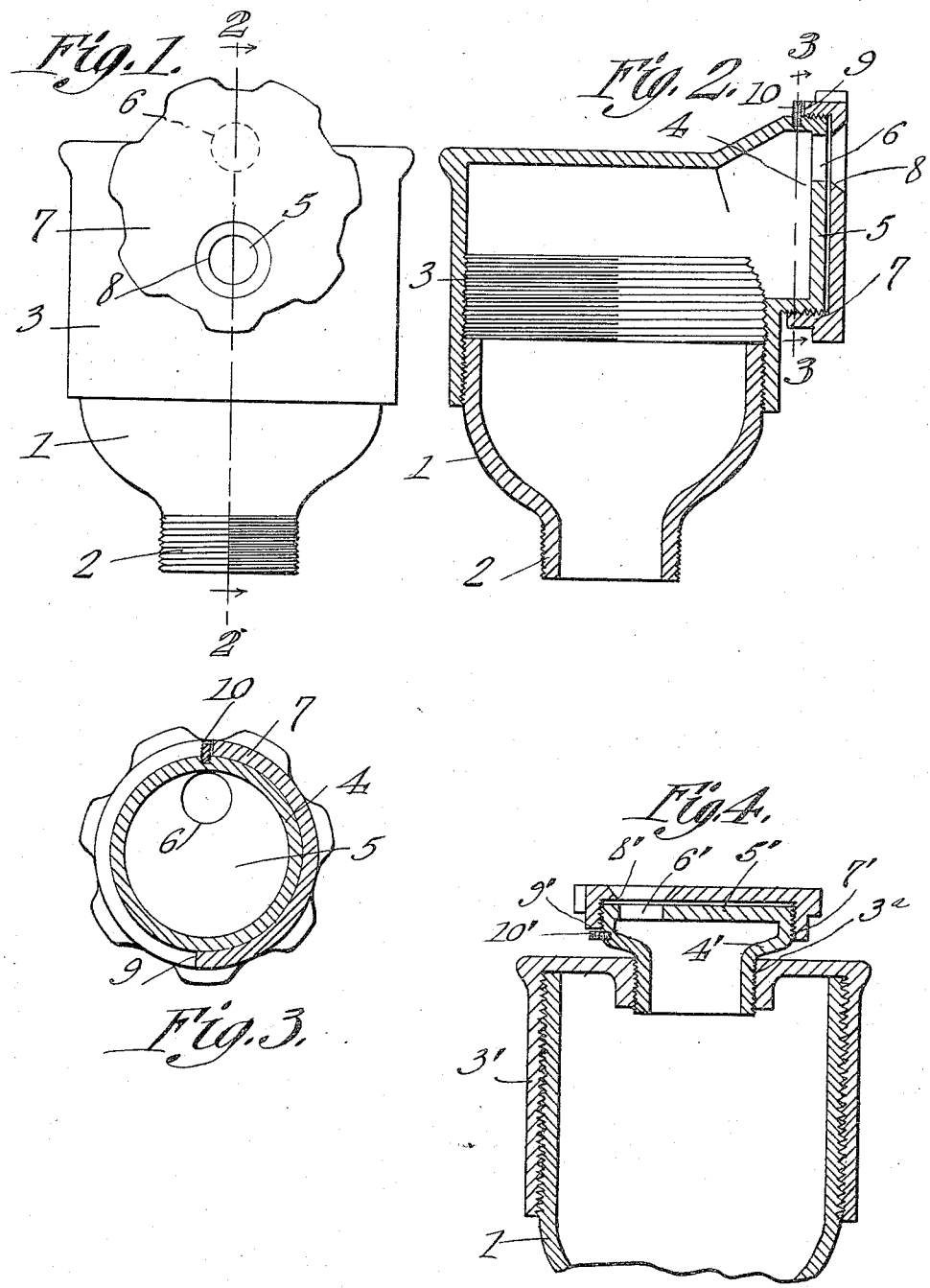

THEODORE W. CARTER, OF SILVER CITY, NEW MEXICO.

GREASE-CUP.

1,168,478.

Specification of Letters Patent.

Patented Jan. 18, 1916.

Application filed October 8, 1915. Serial No. 54,782.

*To all whom it may concern:*

Be it known that I, THEODORE W. CARTER, a citizen of the United States, residing at Silver City, in the county of Grant and State of New Mexico, have invented a new and useful Grease-Cup, of which the following is a specification.

The present invention appertains to lubricant or grease cups, and aims to provide a device of that character having novel and improved means whereby the cup can be refilled with lubricant or grease without the necessity of removing the cap of the cup as usual.

This invention aims to eliminate the trouble, annoyance and waste of lubricant incident to the refilling of ordinary grease cups, and it is the object of the invention to provide simple and effective means upon a grease cup whereby the supply of lubricant may be replenished in a convenient, non-wasteful and effective manner.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a side elevation of a grease cup of special construction to embody the features of the invention. Fig. 2 is a vertical section taken on the line 2—2 of Fig. 1. Fig. 3 is a sectional detail taken on the line 3—3 of Fig. 2. Fig. 4 is a sectional view, a portion of the cup being broken away, illustrating how the invention can be embodied upon ordinary grease or lubricant cups.

The device illustrated in Figs. 1, 2 and 3 is of special construction so as to embody the features of the invention. This device embodies the grease or lubricant cup proper, designated 1, which cup is of funnel-shape, the spout portion 2 thereof being adapted to be threaded into a bearing or other part into which the lubricant or grease is to be forced, the device being applicable to various machines or parts for lubricating them. Threaded upon the body of the cup 1 is a cap 3, which forms with the cup, a grease or lubricant chamber which is adapted to be reduced for ejecting the lubricant or grease by threading the cap 3 downwardly upon the body or rim of the cup.

In order to enable the lubricant or grease to be readily injected into the cup, the cap 3 is provided at one side with a laterally projecting cylindrical extension 4, which is hollow, and which has an integral end wall or plate 5 across its free end. The extension 4 is integral with the cap 3, said parts being readily molded, and the wall 5 is provided at an eccentric point and adjacent the upper side thereof with an aperture or opening 6. A screw cap 7 is threaded upon the extension 4 so as to be rotatable thereon, and the disk portion of the cap 7 is provided with an eccentrically arranged aperture 8, the edges of which are beveled, whereby when the cap 7 is rotated, the aperture 8 can be brought into and out of registration with the aperture 6.

For limiting the rotation of the cap 7 through an arc of about 180 degrees, the rim of the cap 7 is provided at its edge with an arcuate cut away portion 9 extending through an arc of about 180 degrees, and a stop 10 is secured to the extension 4 within the cut away portion of the cap, so that the ends of the cut away portion 9 provide shoulders to bear against the stop 10 when the cap 7 is rotated to bring the aperture 8 in alinement with or away from the aperture 6. In other words, the extension 4 and cap 7 have coöperable stop portions of suitable charcter to limit the rotatory movement of the cap 7 properly.

In use, to replenish the supply of grease or lubricant within the cup, the cap 7 is first rotated to bring its aperture 8 into registration with the aperture 6, so that air can be drawn into the device when the cap 3 is unscrewed but not off of the cup 1, it being unnecessary to remove the cap 3. The lubricant or grease is then injected into the device through the apertures 8—6, preferably by means of a grease gun, and after the device is filled, the cap 7 is rotated to the position illustrated in Fig. 1, to bring the aperture 8 thereof opposite the aperture 6. The aperture 6 is therefore closed, and the cap 3 may then be screwed down upon the cup 1 for forcing the lubricant to the parts to be lubricated. The present invention therefore enables the lubricant cup to be refilled without the necessity of detaching the cap 3 from the cup 1, and as a consequence, the lubricant cup can be filled in a more simple, convenient and practical manner. The present device also prevents waste, and reduces to a minimum, the liability of dust, grit, or other extraneous matter getting into the grease cup. The extension 4 projecting from one side of the cap 3 provides a handle whereby the cap 3 may be rotated easily, which is a salient feature of the invention.

Fig. 4 illustrates how the invention can be applied to an ordinary grease cup. To accomplish this result, the cap 3' of the ordinary grease cup 1 is provided with a central threaded aperture 3ª in its disk portion, and a funnel-shaped member or attachment 4' has its spout portion threaded into the aperture 3ª. The member 4' is hollow, and has an end wall or plate 5' extending across its mouth or outer end, and the wall 5' is provided with an eccentrically arranged aperture 6'. The cap 7' similar to the cap 7 above described, is threaded upon the cylindrical body portion of the member or extension 4', and is provided with an eccentrically arranged aperture 8' in its disk portion whereby, when the cap 7' is rotated, the aperture 8' thereof is brought into and out of registration with the aperture 6'. The rim of the cap 7' has a cut away portion 9' in which is disposed the stop 10' secured to the member 4', whereby the rotatory movement of the cap 7' is limited, the same as with the cap 7. The member 4' can be readily applied to ordinary grease cups, and enables the same to be refilled easily, without removing the cap 3'. To refill the cup 1, the cap 7' is turned so as to bring its aperture 8' into alinement with the aperture 6', so that air can be drawn into the device, and the cap 3' is then unscrewed but not detached from the cup 1. The grease or lubricant can then be injected through the apertures 8'—6' into the device to fill the same, and in which event, the cap 7' can be turned for closing the aperture 6'. The cap 3' can then be screwed down for forcing the grease or lubricant out of the cup to the parts to be lubricated. Although, in the modified form, the member 4' is threadedly or detachably engaged with the cap 3', it may be said that said cap is provided with the member 4', the same as if the member 4' were integral with the cap 3'.

In assembling the devices, the caps 7 and 7' must be first threaded into place, in which event the screws or stops 10 and 10' are applied, which will prevent the caps from being detached or lost. When the caps are turned to closed position, they bear tightly over the respective apertures 6 and 6', to provide a tight fit.

Having thus described the invention, what is claimed as new is:—

1. A grease cup, a cap threaded thereon and provided with a cylindrical member extending therefrom having an end wall across the end thereof, said wall having an eccentrically arranged aperture, and a rotatable closure upon the said member having an aperture adapted to be brought into and out of registration with the aforesaid aperture.

2. A grease cup, a cap thereon provided with a cylindrical member extending therefrom having an end wall across the end thereof, said wall having an eccentrically arranged aperture, and a cap threaded upon said member and having an eccentrically arranged aperture to be brought into and out of registration with the aforesaid aperture.

3. A grease cup, a cap thereon provided with a cylindrical member extending therefrom having an end wall across the end thereof, said wall having an eccentrically arranged aperture, and a cap threaded upon said member and having an eccentrically arranged aperture to be brought into and out of registration with the aforesaid aperture, the rim of the last mentioned cap and the member having coöperating means for limiting the rotary movement of said last mentioned cap.

In testimony that I claim the foregoing as my own, I have hereto affixed my signature in the presence of two witnesses.

THEODORE W. CARTER.

Witnesses:
FRANCES CASE,
M. L. BLAKELY.

Copies of this patent may be obtained for five cents each, by addressing the "Commissioner of Patents, Washington, D. C."